US005115731A

United States Patent [19]

Maitland

[11] Patent Number: 5,115,731

[45] Date of Patent: May 26, 1992

[54] FOOD HEATING AND DISPENSING VENDING MACHINE

[75] Inventor: Peter Maitland, Fort Lauderdale, Fla.

[73] Assignee: Vendtron, Inc., Pompano Beach, Fla.

[21] Appl. No.: 782,915

[22] Filed: Oct. 25, 1991

Related U.S. Application Data

[63] Continuation of Ser. No. 504,950, Apr. 5, 1990, abandoned.

[51] Int. Cl.[5] .............................. A47J 27/00

[52] U.S. Cl. .............................. 99/327; 99/323.9; 99/357; 99/427; 222/370

[58] Field of Search .............. 99/326, 327, 341, 342, 99/357, 426, 427, 450, 407, 323.9; 222/370; 219/400

[56] References Cited

U.S. PATENT DOCUMENTS 1,189,954 7/1916 Jacobs .............................. 222/370 X
1,890,737 12/1932 Leweke .............................. 99/407 X
3,076,580 2/1963 Heath .............................. 222/370 X
3,129,853 4/1964 Hoskins .............................. 222/370 X
3,818,820 6/1974 Harris et al. .............................. 99/407
3,870,193 3/1975 Schneider .............................. 99/357 X
4,155,294 5/1979 Langhammer et al. .............................. 99/427
4,169,419 10/1979 Burgess .............................. 222/370 X
4,722,267 2/1988 Galockin et al. .............................. 99/357
4,838,455 6/1989 Hoeberigs .............................. 99/357 X

*Primary Examiner*—Harvy C. Hornsby
*Assistant Examiner*—Mark Spisich
*Attorney, Agent, or Firm*—Krass & Young

[57] ABSTRACT

A vending machine 10 has a hopper 24 which leads to a modular dispenser unit 38 which includes a hopper chute 26, a top plate 28, a bottom plate 32 and a carousel assembly 36 interposed between the top and bottom plates 28 and 32. The carousel assembly includes a closing plate and a container 53 depending therefrom which includes two mesh screen walls and two solid side walls. The carousel assembly is rotatable between the top and bottom plate such that the container is filled when it passes under the opening in the top plate. The container is moved to be adjacent a heat gun 66 which heats the food within the container 53 and is further moved to be over a discharge opening in the bottom plate which allows dispensing the heated food from the container.

7 Claims, 4 Drawing Sheets

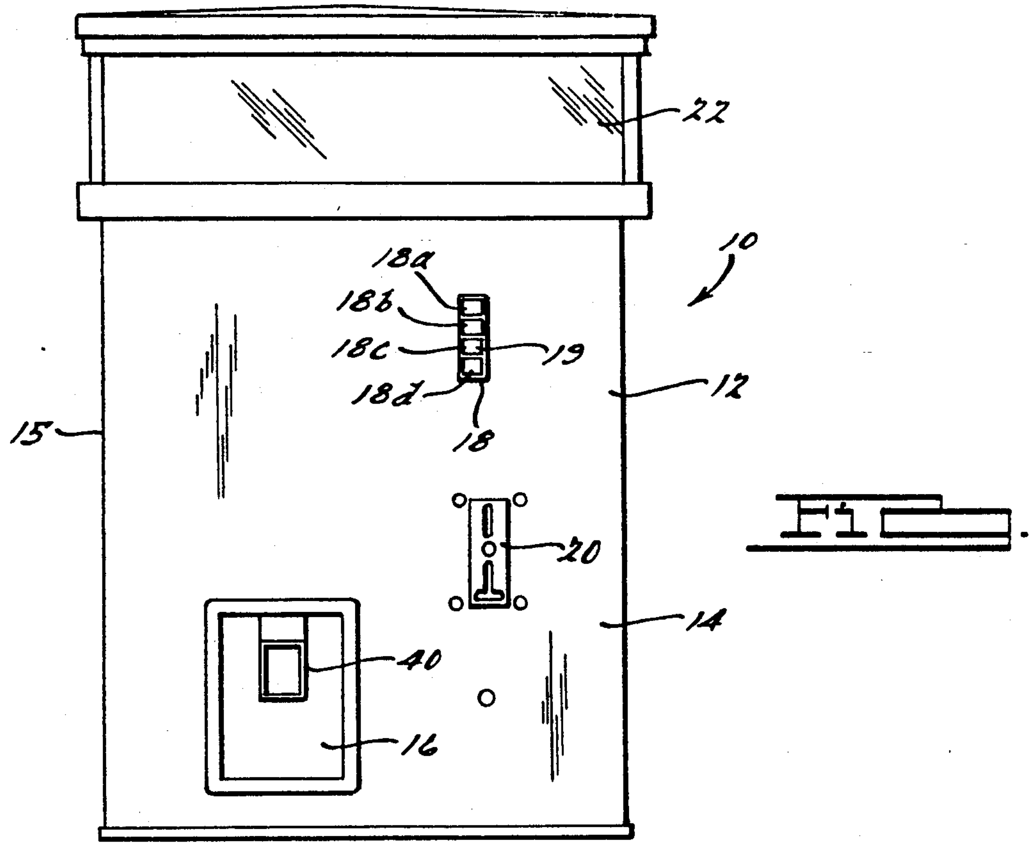
FIG. 1.
FIG. 4.
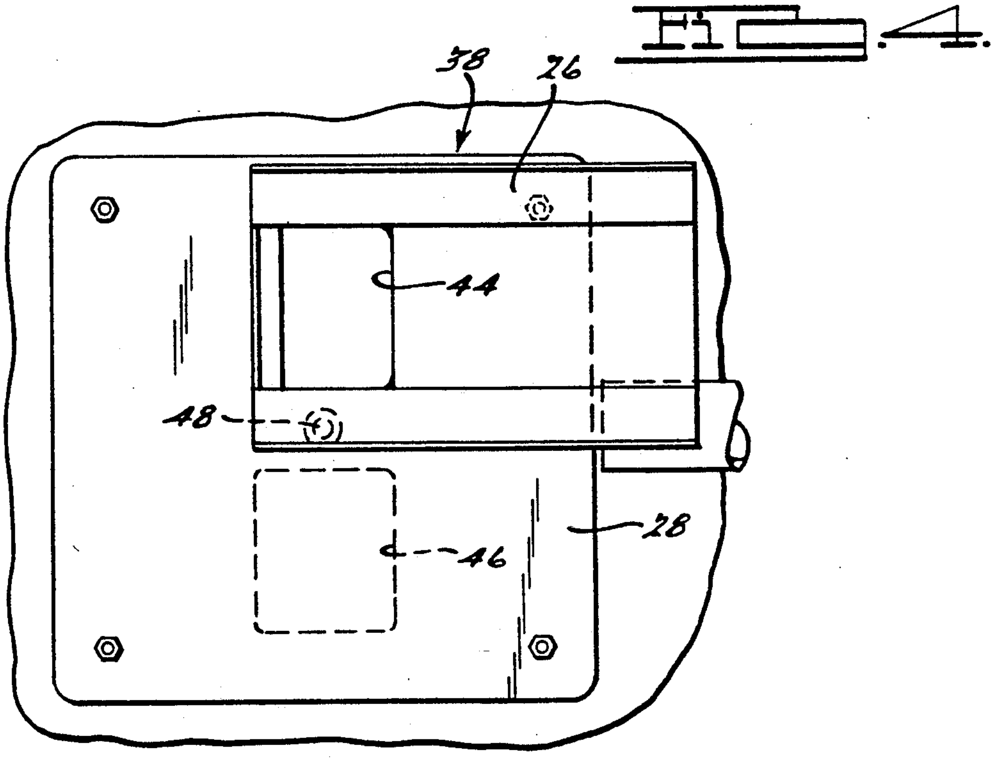

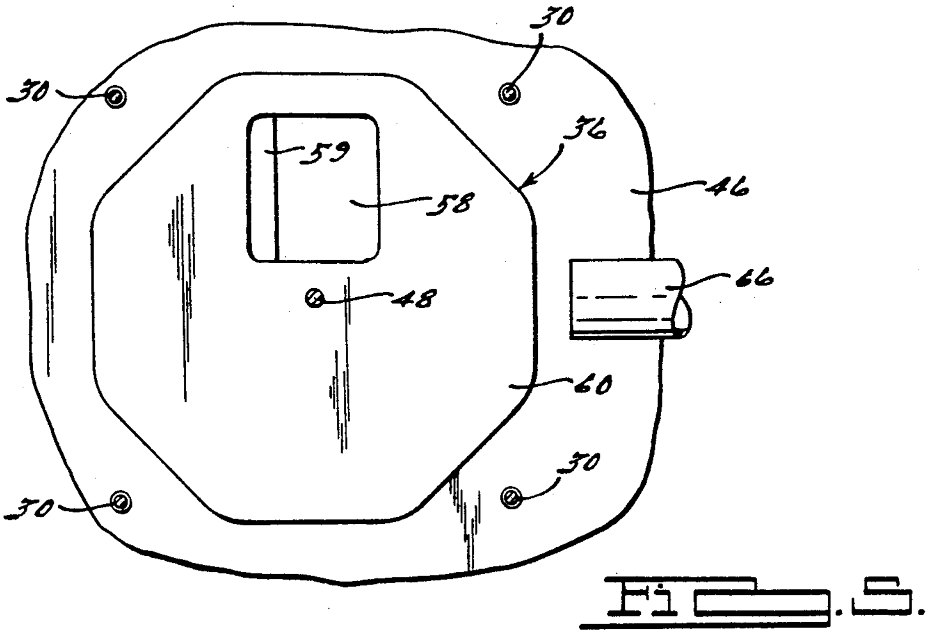
FIG. 5.
FIG. 6.
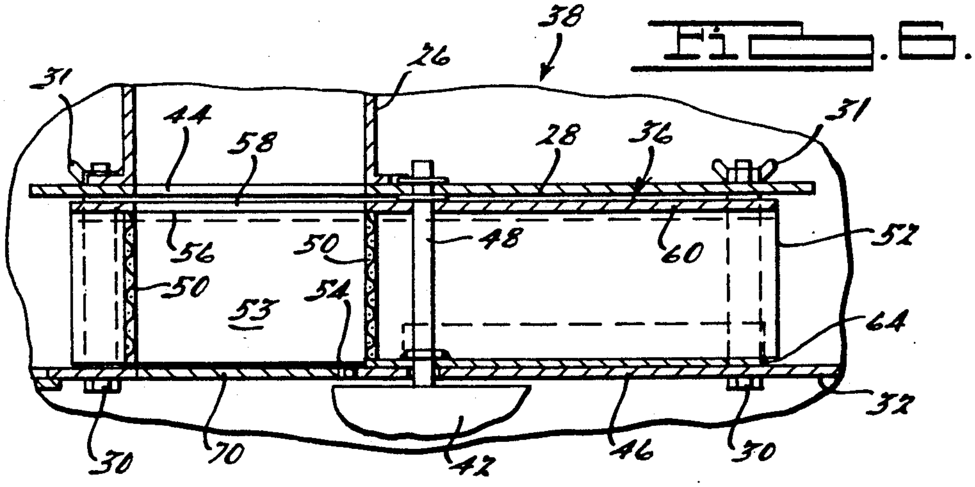
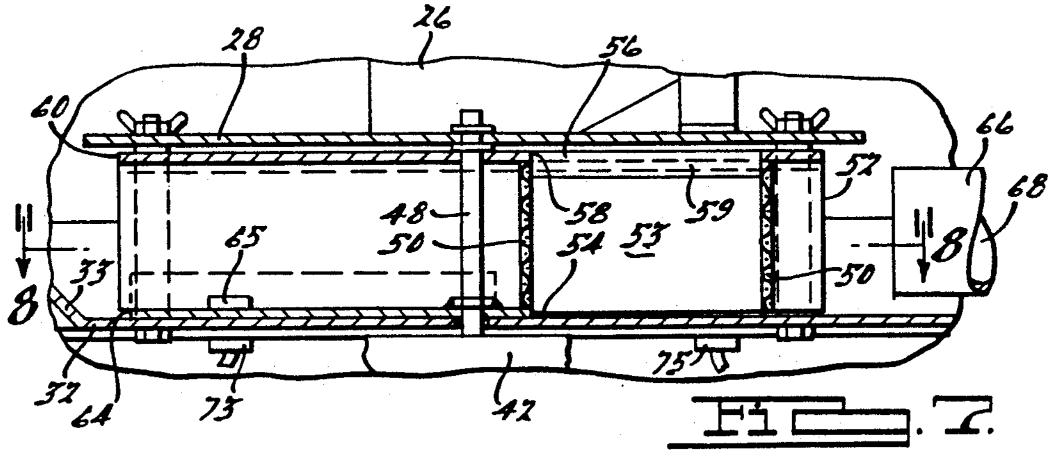
FIG. 7.

FOOD HEATING AND DISPENSING VENDING MACHINE

This is a continuation of co-pending application Ser. No. 504,950 filed on Apr. 5, 1990, abandoned.

TECHNICAL FIELD

The present invention relates to a vending machine and particularly to a vending machine which heats and dispenses a portion of food upon activation of the machine.

BACKGROUND OF THE INVENTION

Vending machines for dispensing bulk food items such as peanuts, cashews, sunflower seeds and other similar foods are well known. The machines have a contained supply of food and a dispensing mechanism for dispensing a portion of food per activation of the machine.

Vending machines have also been constructed to heat the portion of food prior to dispensing in order to enhance the flavor of the served portion of food. However these machines that preheat food have several obstacles that prevent them from being more popular. Many of them have complicated mechanisms with various trap doors that could easily malfunction or jam and render the vending machine inoperable and thereby causing the loss of revenue to the vending machine owner. Secondly these machines often are difficult to clean. It is particularly difficult and time consuming to empty a stale supply of food from the hopper and restock with a fresh supply of food. As a consequence, many potential customers doubt the freshness of the food in the machines and therefore avoid using these machines.

There is a need for an improved vending machine which can create confidence with the consumer that the machine is regularly cleaned and offers a fresh supply of food. Furthermore, a highly reliable vending machine is desired which heats only the portion of food that is to be immediately dispensed.

SUMMARY OF THE DISCLOSURE

In accordance with the one embodiment of the present invention, a vending machine has a hopper for the supply of bulk food, for example nuts, which is in communication with a modular dispensing unit. The dispenser unit has a feed chute mounted to a top plate that has an opening therethrough. The top plate is mounted to a bottom plate and spaced apart therefrom. The bottom plate has an opening misaligned from the opening in the top plate. Interposed between the top and bottom plate is a movable container for receiving food from the opening in the top plate. In one embodiment, the dispenser unit has the container mounted on a carousel assembly and radially spaced from the axis of rotation of the carousel. A drive mechanism is operably connected to the carousel. The drive mechanism is a motor mounted to one of the plates, preferably the bottom plate, and is controlled by a plurality of circumferentially spaced switches about the dispenser unit mechanism that are actuated by rotation of the carousel. A heater is actuated that directs heat between the two plates after food is dispensed into the container. The drive mechanism then moves the container over the opening in the bottom plate to dispense the heated food through a discharge chute.

Preferably the container has two opposite porous side walls preferably made from a mesh or screen material to allow heated air to pass therethrough. Two other side walls are solid to help channel heated air from the heater through the two mesh side walls.

Preferably the heater has separate heater coils and a separately operated blower that blows hot air and is circumferentially positioned about the carousel between the top plate opening and bottom plate opening. The container is positioned on the carousel such that when the container is rotated 90°, the mesh walls are positioned with respect to the heater to allow the airflow to pass through the mesh walls. Conversely, the solid side walls are positioned to provide a channel passage for the airflow.

A closure device closes the opening to the feed chute when the container is not aligned under the opening of the top plate. The closure device is preferably a closing plate mounted to the container that has an inlet therethrough in communication with the container. When the carousel assembly is rotated such that the container is not under the opening in the top plate, the inlet in the closing plate is also misaligned from the top plate opening such that the closing plate closes the feed chute. Preferably, the opening in the bottom plate is 180° radially displaced from the opening in the top plate with respect to the axis of rotation.

Operation switches on the carousel are operably connected to a control unit that provides for the appropriate stops of carousel at the heater and at a standby position actuate and stop the heater and blower at appropriate times. A coin receiving mechanism and various instructional lights and actuating switches are also operably connected to the control unit.

The modular dispenser unit with an interposed carousel is a simply assembled unit. The top plate is removably mounted via vertical shafts about the carousel. After the top plate is removed, the container member of the carousel assembly can easily be removed such that the whole dispenser unit assembly can easily be cleaned.

The bottom plate has a trap door aligned under the opening in the top plate such that when the hopper needs to be empty, the carousel is merely rotated to align the container under the opening in the top plate. The trap door is opened to allow free flow of the food supply from the hopper, through the container, and down through a secondary hopper discharge chute under the trap door. In this way the hopper can be emptied without repetitive cycling of the dispenser unit. This allows for quick and easy emptying of the old food supply and subsequent restocking the hopper with a fresh food supply.

BRIEF DESCRIPTION OF THE DRAWINGS

Reference now is made to the accompanying drawings in which:

FIG. 1 is a front elevational view of one embodiment of a vending machine according to the present invention;

FIG. 4 is a top plan view of the modular dispenser unit shown in FIG. 2;

FIG. 5 is a top plan view of the carousel assembly in the dispenser unit;

FIG. 6 is a cross-sectional view along line 6—6 shown in FIG. 2;

FIG. 7 is the cross-sectional view rotated 90° with respect to FIG. 6 and with the carousel assembly rotated to the heating position.

DETAILED DESCRIPTION OF THE PREFERRED EMBODIMENT

Figure 2:
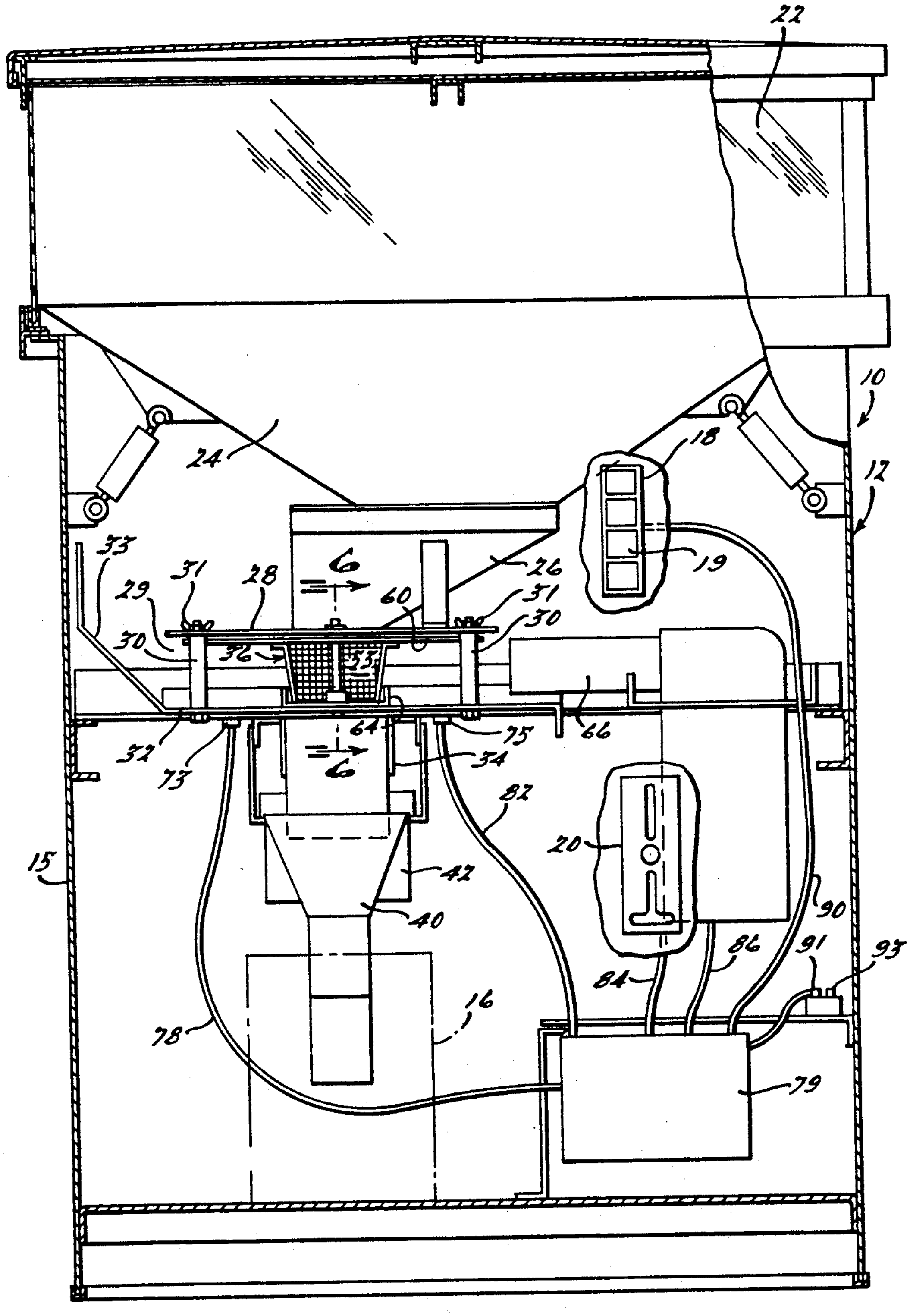
FIG. 2 is a view similar to FIG. 1 with the front panel removed for easy viewing of the internal mechanisms.

Referring to FIG. 1 a vending machine 10 has an outer cabinet or housing 12. The housing 12 has a front panel 14 with a discharge opening 16, various instruction lights 18 in particular lights 18*a*, 18*b*, 18*c* and 18*d*, operating button 19, and a token coin or money receiving mechanism 20. The top section 22 can be made out of a transparent material.

Figure 3:
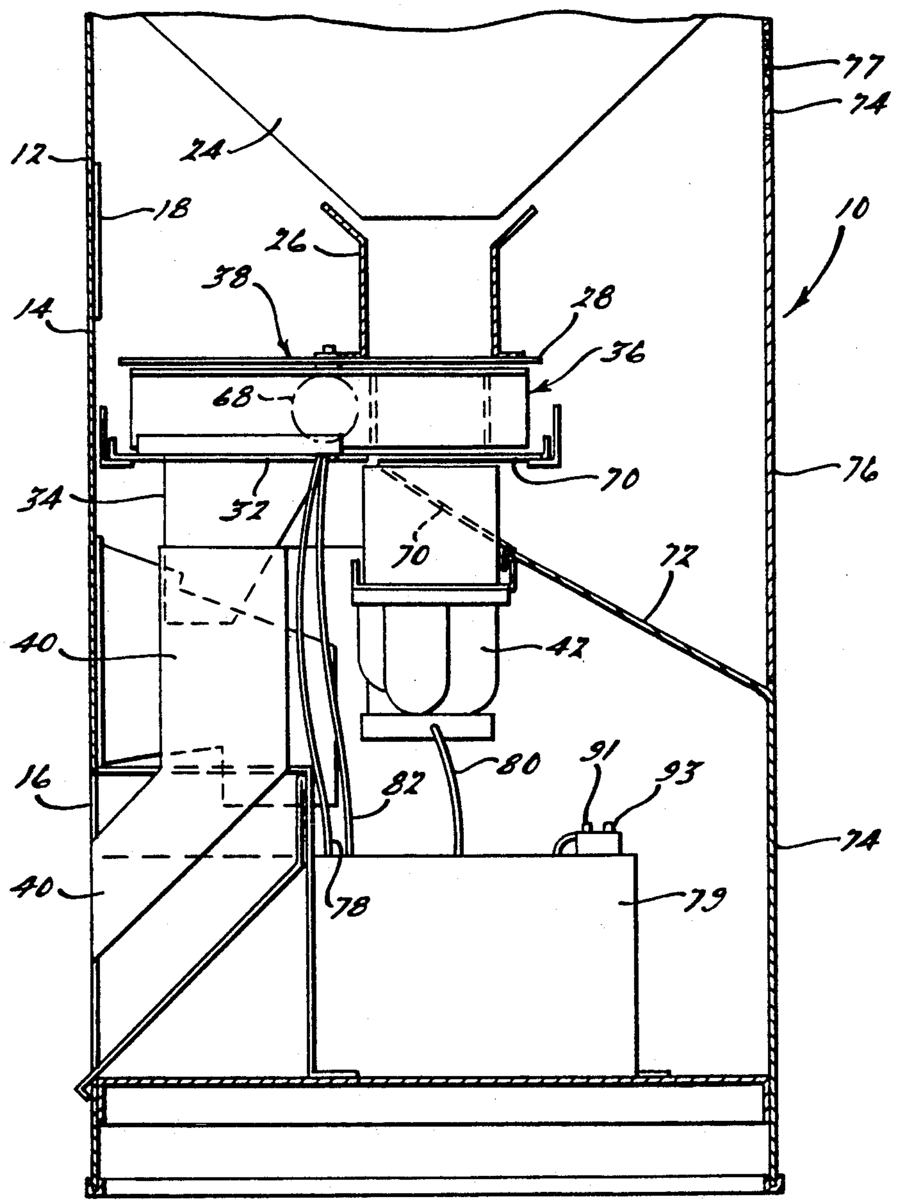
FIG. 3 is a fragmentary side elevational view of FIG. 2.

As shown in FIGS. 2 and 3, the top section 22 allows a person to view the food supply in a storage hopper 24 that is mounted within the housing 12. The bottom of the hopper 24 is in open communication with a hopper feed chute 26 of a modular dispenser unit 38. The chute 26 is mounted on a top plate 28 which in turn is mounted by elongated bolts 30 and wing nuts 31 to a bottom plate 32. The bottom plate 32 has a discharge chute 34 depending therefrom. The top plate 28 and bottom plate 32 are spaced apart to form space 29 and rotor or carousel assembly 36 interposed therebetween.

A motor assembly 42 is also mounted to the underside of bottom plate 32 and is operably connected to the carousel assembly 36.

The carousel assembly 36, top plate 28, bottom plate 32, feed chute 26 and discharge chute 34 and motor 42 form the dispenser unit 38 which dispenses a portion of food from hopper 24 to a discharge funnel 40 mounted under chute 34. The funnel 40 leads to the discharge opening 16 in the front panel 14.

Referring now to FIGS. 4 and 5, the dispenser unit 38 has an aperture 44 through its top plate 28 aligned with the bottom of the hopper chute 26. The bottom plate 32 has an opening 46 misaligned with the aperture 44. The positions of the aperture 44 and opening 46 can be most easily defined with respect to the drive shaft 48 connected to the motor assembly 42 which is vertically mounted at the center of the two plates. The aperture 44 and opening 46 are the same radial distance from shaft 48 and circumferentially spaced 180° apart.

Figure 8:
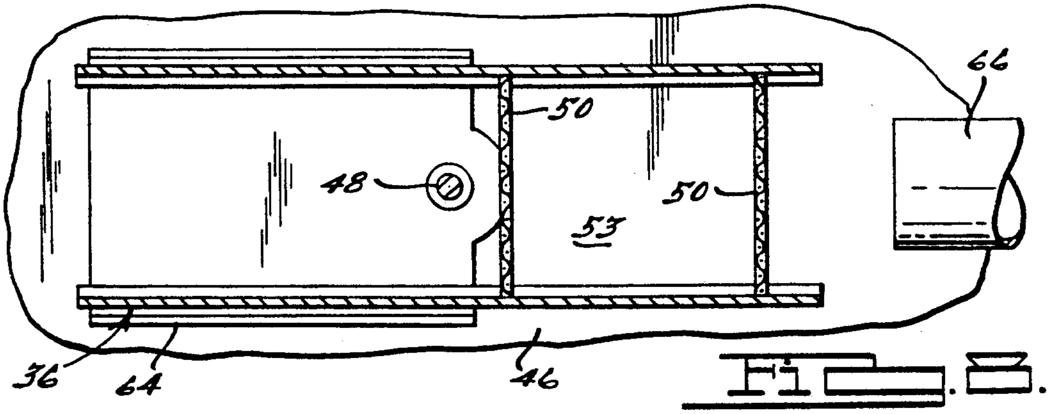
FIG. 8 is a cross-sectional view along line 8—8 shown in FIG. 7.

As shown in FIG. 3, 6 and 8, the bottom plate 32 has a trap door 70 which is aligned directly under aperture 44 and when open communicates with a secondary discharge chute 72 which extends to the back panel 74 which has an access door 76. The back panel 74 can also be provided with air vents 77.

The carousel assembly 36 includes two spaced apart mesh screens 50 which act as two opposing side walls and two other opposing solid side walls 52. The screens 50 and walls 52 define a container 53. The container 53 has an open bottom 54 and an open top 56. The open top 56 is aligned with an opening 58 in a closing plate 60 which is mounted adjacent to and under the top plate 28. The one edge of the opening 58 in closing plate 60 has a canted flange 59.

The solid side walls 52 extend substantially the whole length of the top and bottom plate beyond the mesh screens 50. The bottom edges of the side walls 52 are mounted onto a drive plate 64 which radially extends from drive shaft 48. The drive shaft 48 turns the drive plate 64 which in turn rotates the carousel assembly 36 about the drive shaft 48. The drive plate 64 has a magnet 65 mounted thereon. The underside of the bottom plate 32 has two magnetic reed switches 73 and 75 which interact with magnet 65.

A heating gun 66 has a heating coil assembly 68 in the form of a nozzle pointed to the space 29 between the plates. The gun 66 also has a separate blower 69 upstream from nozzle 68. The bottom plate 32 has an upward vent deflector section 33 which deflects the heated air to prevent it from directly hitting side panel 15.

A control panel 79 is operably connected to the reed switches 73,75, coin mechanism 20, lights 18, switches 19, heater gun 66, blower 69 and drive motor 42 via electrical wire 78, 80, 82, 84, 86 and 90. The control panel 79 may be of any well known mechanical, electromechanical or electronic mechanism such as a printed circuit board and can be programmed in known manner to control and operate dispenser unit 38 in a programmed sequence.

In operation, the hopper 24 is filled with the food to be dispensed such as cashews, peanuts, or sunflower seeds. For this purpose the top section 22 can be opened to allow food supplies to be loaded into the hopper 24.

In the stand-by position the container 53 is opposite the heat gun 66 and between the supply chute aperture 44 and discharge opening 46. Upon the input of the appropriate coinage in the mechanism 20, the control panel 79 actuates the drive motor 42 which rotates the motor 42 which starts to rotate the basket assembly 36. The carousel assembly rotates about drive shaft 48. When the opening 58 rotates under the aperture 44, a portion of food in hopper 24 falls into the container 53 and rests on bottom plate 32. As the carousel assembly 36 continues to rotate about shaft 48, the flange 59 pushes up any food supply out of the way as the opening 58 in the closing plate 60 becomes misaligned with the aperture 44 to prevent wedging of food between the two plates 28 and 60.

Simultaneously as the carousel 36 starts to rotate the control panel also powers up the heater gun 66 and turns on one of the lights 18*a* which has an appropriate legend to instruct the operator to get a cup or bag. The carousel assembly 36 continues to rotate sliding the food on plate 32 until the magnetic reed 73 switch 75 is actuated by the magnet 65 on the drive plate 64 at which time the control panel deactuates the motor 42. Alternatively, a predetermined delay can be introduced before the motor stops.

The carousel assembly and bottom plate 32 and top plate 28 create a tubular channel through which the heated air from the heat gun 66 as shown in FIG. 7 can be channeled through the transverse mesh screens 50 to heat the food that fell into the container 53. The air flow through the channel, deflects upward on Section 33 and passes out through vents 77.

The heating continues for a period of time determined by the control panel. The time the heat gun 66 is actuated is variable. The control panel 79 can take into account the internal temperature within the carousel assembly before the coins actuated the vending machine cycle. During this heating sequence the controller actuates one of the lights 18*b* which has an appropriate legend such as "Place Cup Under Chute." At the end of the predetermined heating time the heater coil assembly 68 is turned off. The blower 69 of the heat gun 66 can continue for a few seconds to cool the coil assembly 68 and then it also is turned off. One of the lights 18*c* flashes to properly instruct the operator to "Press When Ready". Light 18*c* is incorporated into switch 19.

The control panel 79 awaits actuation of switch 19 by the user at which time the drive motor is re-actuated and rotates the carousel assembly to complete the 360° cycle. As the container 53 passes over the discharge opening 46, the heated food falls through the opening 46 and into funnel 34 and through discharge chute 40 and out opening 16 in the front panel. The carousel assembly 36 continues to rotate until the magnetic reed switch 75 is actuated by magnet 65. The vending machine is then ready for another cycle.

The control panel 79 can be programmed to detect malfunction conditions caused by a jammed motor 42 or the magnetic reed switches 73 and 75 not actuating within a predetermined time, or overheating caused by failure of the blower 69 or heater coil assembly 68. If any failures are indicated, one of the lights 18*d* indicating "Out of Order" is turned on and the motor 42 and heat gun 66 are turned off until the malfunction is corrected by a service repairman.

The modular dispensing mechanism allows for easy servicing of the mechanism and easy changes of the food supply. A serviceman can open access panel 79 which exposes an auto/manual switch 91 and operating button 93. If the food supply needs to be changed, either by a restocking of fresh supply or restocking of different foods, the switch 91 is moved to the manual position and button 93 is pressed. The carousel assembly 36 rotates as long as button 93 is pushed. The serviceman keeps button 93 pushed until the carousel assembly 36 is rotated to the loading position so the container 53 is aligned under the aperture 44. The serviceman can then open the trap door 70 at which time the food from the hopper can pass through the container 53 down to a secondary discharge chute 72 that leads to the access panel 76. When the manual auto switch 91 is in the auto position the operating push button 93 may be used to start the cooking cycle without having to insert coins for testing the operation of the vending machine.

The modular aspect of the dispensing unit 38 allows for easy maintenance and cleaning. Once the hopper 24 is unloaded, the hopper chute 26 and top plate 28 can be easily removed after wing nuts 31 at the top of bolts 30 are loosened and removed. The carousel assembly 36 can then be lifted off of the drive shaft 48. The hopper chute 26, top plate 28 and the basket assembly 36 can be easily removed from the vending machine 10 and washed. The bottom plate 32 can be easily wiped clean as can the discharge funnel 34.

The carousel assembly 36, top plate 28, and hopper chute 26 can then be easily remounted. The hopper 24 be easily reloaded. The ease of changing the food supply and cleaning the dispenser unit 38 promotes the regular maintenance and upkeep of the vending machine 10 and promotes the maintenance of fresh food in a clean and healthy atmosphere.

The carousel assembly and the heating system provides for a vending machine that heats the food to increase and enhance the flavor without the use of trap doors that pivot or can get easily entangled and abused. As such a vending machine is provided that is reliable, easily used, easily maintained and promotes the marketing of hot food snacks.

Variations and modifications of the present invention are possible without departing from the scope and spirit as defined in the appended claims.

The embodiments in which an exclusive property and privilege is claimed are defined as follows:

1. A vending machine for dispensing food, said machine including:
   - a housing;
   - a food storage hopper mounted in said housing;
   - a dispenser mounted in said housing and including inlet means for receiving a food supply from said storage hopper, outlet means for discharging said food supply from said dispenser, a container for holding said food supply mounted for movement between a first position for receiving said food supply from said inlet means, a second position for discharging said food supply through said outlet means, and a third position intermediate said first and second positions, a closure means affixed to said container and operative to close said inlet means when said container means is moved away from said first position, and drive means for moving said container means between said first, second, and third position; and
   - a heater mounted adjacent said third position of said container for heating said food in said container with the container in said third position.

2. A vending machine as defined in claim 1 wherein:
   - said inlet means includes a first plate having an inlet aperture therethrough;
   - said outlet means includes a second plate having an outlet aperture therethrough misaligned from said inlet aperture;
   - said first and second plates are spaced apart;
   - said container is slidably interposed between said first and second plates; and
   - said closure means comprises a closing plate attached to said container and mounted adjacent the first plate such that when said container is moved away from said first position said closing plate is positioned to close said inlet aperture.

3. A vending machine as defined in claim 2 further characterized by:
   - said second plate having a trap door and trap door opening aligned with said inlet aperture of said first plate such that when said container means is in the first position said trap door can be opened to allow emptying of said hopper through said inlet aperture, said container means and said trap door opening.

4. A vending machine for dispensing food, said machine including:
   - a food storage hopper;
   - a dispenser mounted under said hopper and including an inlet for receiving a food supply from said hopper, a container for holding said food supply, closure means for closing said inlet means, and an outlet;
   - said container being mounted for movement between a first position for receiving said food supply from said hopper via said inlet, a second position for discharging said food supply through said outlet, and a third position intermediate said first and second positions; and
   - a heater positioned in proximity to said third position of said container for heating said food supply in said container with said container in said third position;
   - said dispenser having a second openable and closable outlet aligned with said inlet so that with said container in said first position it is interposed between said second outlet and said inlet, said container having an open top and an open bottom, said second outlet being normally in a closed mode but openable when said container is in said first position to allow food supply within said hopper to pour through said container and out through said second outlet.

5. A vending machine for dispensing food, said machine including:

a housing;

a food storage hopper mounted in said housing;

a dispenser mounted in said housing an including inlet means for receiving a food supply from said storage hopper, outlet means for discharging said food supply from said dispenser, a container for holding said food supply mounted for movement between a first position for receiving said food supply from said inlet means and a second position for discharging said food supply through said outlet means, a closure means affixed to said container and operative to close said inlet means when said container means is moved away from said first position, and drive means for moving said container means between said first and second positions; and a heater mounted adjacent said container for heating said food supply in said container;

said inlet means including a first plate having an inlet aperture therethrough;

said outlet means including a second plate having an outlet aperture therethrough misaligned with said inlet aperture;

said first and second plates being spaced apart;

said container being slidably interposed between said first and second plates;

said closure means comprising a closing plate attached to said container and mounted adjacent the first plate such that when said container is moved away from said first position said closing plate is positioned to close said inlet aperture;

said container including two solid opposing side walls and two porous side walls for allowing flow of air therethrough;

said solid side walls and said first and second plates forming a channel to direct the flow of air through said two porous side walls;

said heater being operative to provide a flow of heated air through said porous side walls whereby to heat said food supply in said container;

said drive means including a motor and a drive shaft extending through one of said first and second plates and rotating said container about said drive shaft between said first and second positions.

6. A vending machine as defined in claim 5 wherein said machine further includes a control means for selectively actuating and deactuating said drive means when said container is rotated between said first and second positions.

7. A vending machine as defined in claim 6 wherein said control means is operative to deactuate said drive means for a preselected amount of time when said container is at a position adjacent said heater to allow said heater to heat said food supply within said container.

* * * * *